United States Patent [19]

Mahorney, deceased et al.

[11] E Re. 28,520

[45] Reissued Aug. 19, 1975

[54] SAFETY VALVE ASSEMBLY FOR CONTROLLING CLUTCH AND BRAKE IN POWER PRESS OR THE LIKE

[75] Inventors: Kenneth R. Mahorney, deceased, by Ardith Mahorney, legal representative, Bartlett, Ill.

[73] Assignee: Ross Operating Valve Company, Detroit, Mich.

[22] Filed: Sept. 14, 1973

[21] Appl. No.: 397,306

Related U.S. Patent Documents

Reissue of:

[64] Patent No.: 3,670,767
Issued: June 20, 1972
Appl. No.: 122,008
Filed: Mar. 8, 1971

[52] U.S. Cl. ..... 137/596
[51] Int. Cl. ..... F16k 11/10
[58] Field of Search..... 137/596, 596.12, 596.14, 137/596.16, 596.17, 596.18, 625.66, 625.6, 625.64; 91/444, 448, 446, 447; 100/53

[56] References Cited

UNITED STATES PATENTS

| | | | |
|---|---|---|---|
| 3,043,335 | 7/1962 | Hunt | 137/596.15 |
| 3,265,089 | 8/1966 | Nill | 137/596.16 |
| 3,603,348 | 9/1971 | Wright | 137/596.16 |

*Primary Examiner*—Martin P. Schwadron
*Assistant Examiner*—Robert J. Miller
*Attorney, Agent, or Firm*—Harness, Dickey & Pierce

[57] ABSTRACT

A valve assembly for a pressurized fluid line controlling a clutch and brake made up of a pair of valves having movable valve members with separate actuators, each of the valve members having inlet ports and outlet ports, the inlet ports being connected in series and the outlet ports being connected effectively in parallel so that both valves must be activated to pass the pressurized fluid to the control line and so that upon unwanted sticking of one of the valve members in activated position, pressure fluid to the control line is cut off and exhaust fluid from the line is promptly and directly vented.

14 Claims, 5 Drawing Figures

BOTH A+B OPEN

BOTH A+B CLOSED AND EXHAUSTING

INVENTOR
KENNETH R. MAHORNE by: Wolfe, Hubbard, Leydig, Voit & Osann
ATTYS

B STUCK OPEN

A CLOSED AND EXHAUSTING

A STUCK OPEN

B CLOSED AND EXHAUSTING

INVENTOR
KENNETH R. MAHORNEY

By: Wolfe, Hubbard, Leydig, Voit & Osann
ATTYS.

SAFETY VALVE ASSEMBLY FOR CONTROLLING CLUTCH AND BRAKE IN POWER PRESS OR THE LIKE

Matter enclosed in heavy brackets [ ] appears in the original patent but forms no part of this reissue specification; matter printed in italics indicates the additions made by reissue.

---

It has been recognized in the past that use of a simple three-way valve for alternatively admitting pressurized fluid to a clutch and brake control line in a power press, and exhausting fluid therefrom, does not provide adequate safety since sticking of the valve in its "activated" condition may prevent the slide from safely coming to rest at the top of the stroke at the completion of a press cycle. Unwanted descent of the slide may cause a serious accident. To provide a safety factor it has been proposed in the past that two separately actuated three-way valves be connected in parallel with one another. Thus if one of the valves sticks in its open or activated position the fluid which is passed is harmlessly vented through the companion valve. The drawback to this is that the flow of vented fluid is so great as to produce a condition of partial or back pressure in the control line so that the clutch may be completely disengaged nor the brake surfaces fully seated.

It has also been proposed to connect two three-way valves effectively in series with one another which insures shut-off of the pressurized fluid in the event that one of the valves sticks in open position. The problem here is that where the downstream valve is the sticking one the fluid which is exhausted from the control line must be exhausted through inlet ports, which are usually quite restricted in cross section, which delays venting and therefore delays de-clutching and setting of the brake.

It is, accordingly, an object of the present invention to provide a valve assembly in which both of these undesirable conditions are obviated. More specifically it is an object of the invention to provide a valve assembly having first and second separately actuated valve members which have inlet ports connected in series so that pressurized fluid cannot flow as long as at least one of the valve members responds to the deactuation and which insures prompt and direct venting of the control line to near zero pressure without necessity for the exhausted fluid to traverse the inlet ports of either of the two valves.

Other objects and advantages of the invention will become apparent upon reading the attached detailed description and upon reference to the drawings in which.

While the invention is described in connection with a preferred embodiment, it will be understood that I do not intend to limit the invention to the particular embodiment shown but intend, on the contrary, to cover the various alternative and equivalent valve constructions which are included within the spirit and scope of the appended claims.

Figure 1:
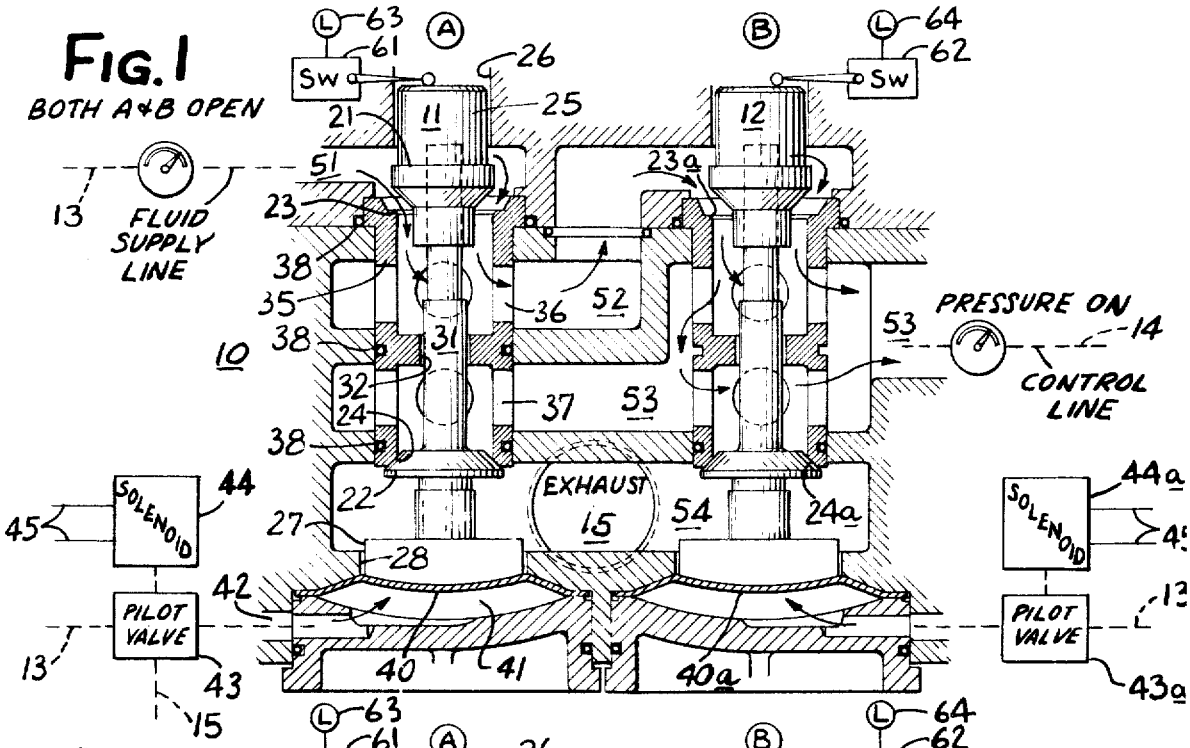
FIG. 1 shows, in cross section, a valve assembly constructed in accordance with the present invention and employing two separately actuated valve members which are both in "activated" condition for pressurizing the clutch and brake control line.

Turning now to FIG. 1, a frame or housing 10 is provided mounting a pair of valve members 11, 12. Ports are provided in the valve housing for connection to an air supply line 13, a control, or output, line 14, and an exhaust line 15. The valve members are, in the present instance, in the form of spools mounted for vertical movement. Taking the spool 11 by way of example, in portion A of the valve, it has spaced, inwardly facing flanges 21, 22 cooperating with respectively opposed valve seats 23, 24. The valve seats are spaced axially by a lesser distance than the flanges so that the valve spool is movable between limit positions, that is, between an upper position, which will also be referred to as an "activated" or "on" position in which the upper seat 23 is open, and a lower position, also referred to as a "deactivated" or "off" position, in which the upper seat 23 is sealed off. For permitting endwise movement of the valve spool, the spool has a cylindrical projection 25 at its upper end which is slidable in a bore 26 as well as a cylindrical projection 27 at its lower end slidable in a bore 28. The central stem of the valve spool, which is of reduced diameter, and which is indicated at 31, is snugly fitted and slideable within a central land 32.

For convenience the seats 23, 24 and central land 32 are all formed on a cylindrical insert 35 which is sealed to the body or housing 10 of the valve by suitable O-rings. The cylindrical insert 35 is provided with sets of lateral openings 36, 37, which sets may be respectively four in number and arranged, as shown, at two different levels. The insert 35 is sealed at three levels by O-rings 38.

For the purpose of moving the valve spool 11 to its upper or "on" position as shown in FIG. 1, the lower end of the valve spool is engaged by a flexible diaphragm 40, defining below it a space 41 into which air or other pressurized fluid may be admitted through a pilot orifice 42.

The pilot orifice 42 is supplied with air or other piloting fluid from a pilot valve 43 which may be connected to the same supply line 13 which serves as the source of pressure fluid and with the valve being operated by a solenoid 44 under the control of electrical line 45. The pilot valve 43 and solenoid 44 will be understood to be conventional and readily available, in combined form, as a commercial unit.

Turning attention next to the valve member, or spool, 12 in part B of the valve, and the cylindrical insert which cooperates with it, it will be noted that the construction is the same and, accordingly, corresponding elements have been designated by corresponding reference numerals with the addition of subscript a. The spool is actuated by a diaphragm 40a under the control of a pilot valve and solennoid 43a, 44a.

In accordance with the present invention the valve housing 10 includes a supply line chamber 51, an intermediate chamber 52, a control line chamber 53 and an exhaust line chamber 54. The seat 23 of the first movable valve member is interposed between the fluid supply line chamber 51 and the intermediate chamber 52 whereas the seat 23a, associated with the second valve member is interposed between the intermediate chamber 52 and the control line chamber 53 so that the pressure fluid entering at the chamber 51 is conducted past the valve seat 23 then past the valve seat 23a before passing into the control line. Stated in simple terms, the inlet ports of the two valve members are connected in series with one another. Since, before pressurized fluid can be passed to the control line 14, such fluid must flow in succession past the seats 23, 23a, both of the valve members 11, 12 must be in their activated or "on" positions, and the failure of either valve element to be in such position prevents pressure from passing into the control line.

Figure 2:
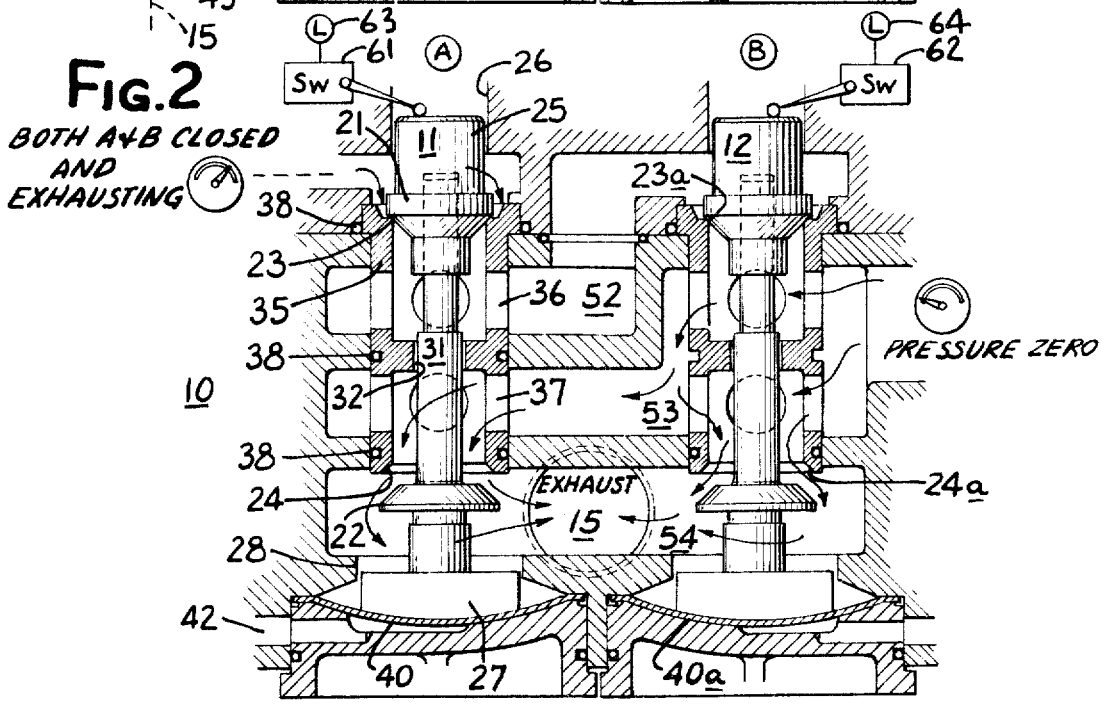
FIG. 2 shows the valve assembly of FIG. 1 in deactuated condition with both of the valve members turned off and with the control line being vented to the exhaust condition.
Figure 2A:
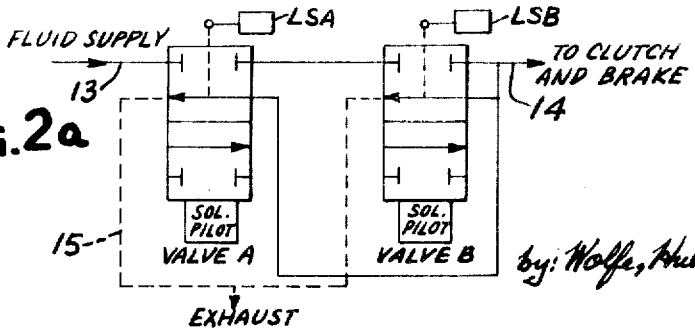

Further in accordance with the invention the valve seats 24, 24a are both directly interposed between the control line chamber 53 and the exhaust line chamber 54 so that when the valve members are in their upper position shown in FIG. 1 the exhaust line is sealed off, but when valve members are in their lower or "off" position, pressurized fluid in the control line 14 is free to escape, or be vented, past both of the seats 24, 24a into the exhaust line 15. It is the latter condition which is illustrated in FIG. 2 which shows the diaphragms 40, 40a collapsed and with the valve members 8, 12 lowered by gravity to seal off the upper, or inlet seats 23, 23a while opening both of the exhaust seats 24, 24a.

Since the pressurized fluid from the control line 14 is free to escape simultaneously past both of the seats 24, 24a, such seats are effectively connected in parallel with one another. The advantage of this is that in the event that either of the valve members 11, 12 should fail to respond, or drop, from the "on" position shown in FIG. 1 to the "off" position shown in FIG. 2, the pressurized fluid in the control line 14 will nevertheless be directly and fully vented to the exhaust line 15 producing an immediate drop in the pressure of the control line to zero. Note that the term "directly vented" has been employed which makes it clear that pressurized fluid from the control line is directly vented past a single valve seat into the exhaust line. This is to be contrasted with prior "series" valve systems which did provide positive cut off of pressurized fluid but which also required that the venting occur in series relation past two successive valve seats presenting an obstruction to the flow of fluid and a delay in the venting cycle.

Figure 3:
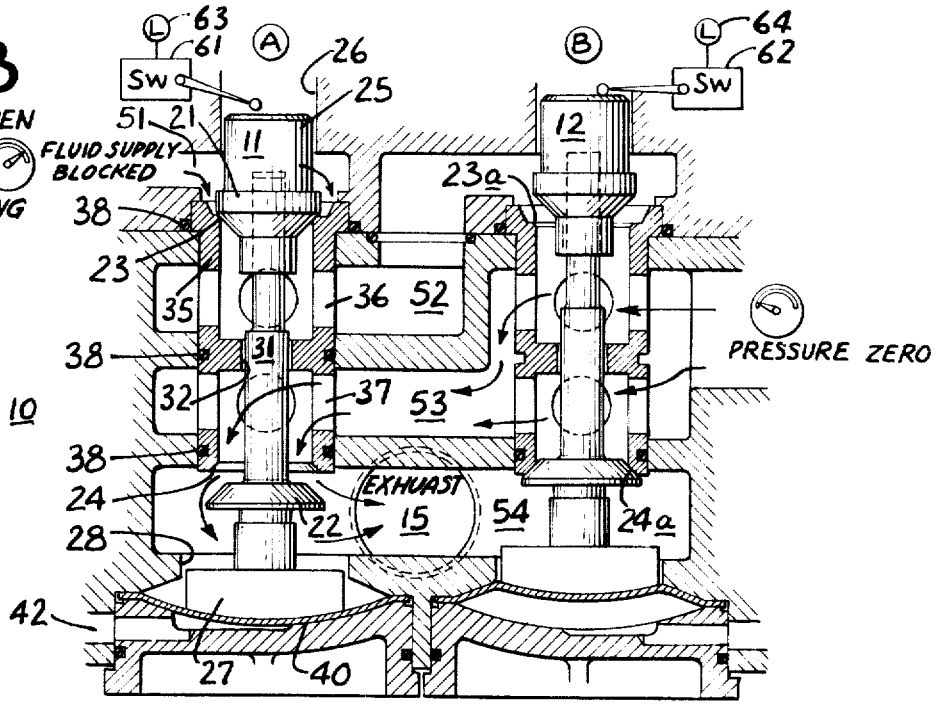
FIG. 3 shows the condition of the valve assembly with the second valve member inadvertently stuck in open condition.
Figure 4:
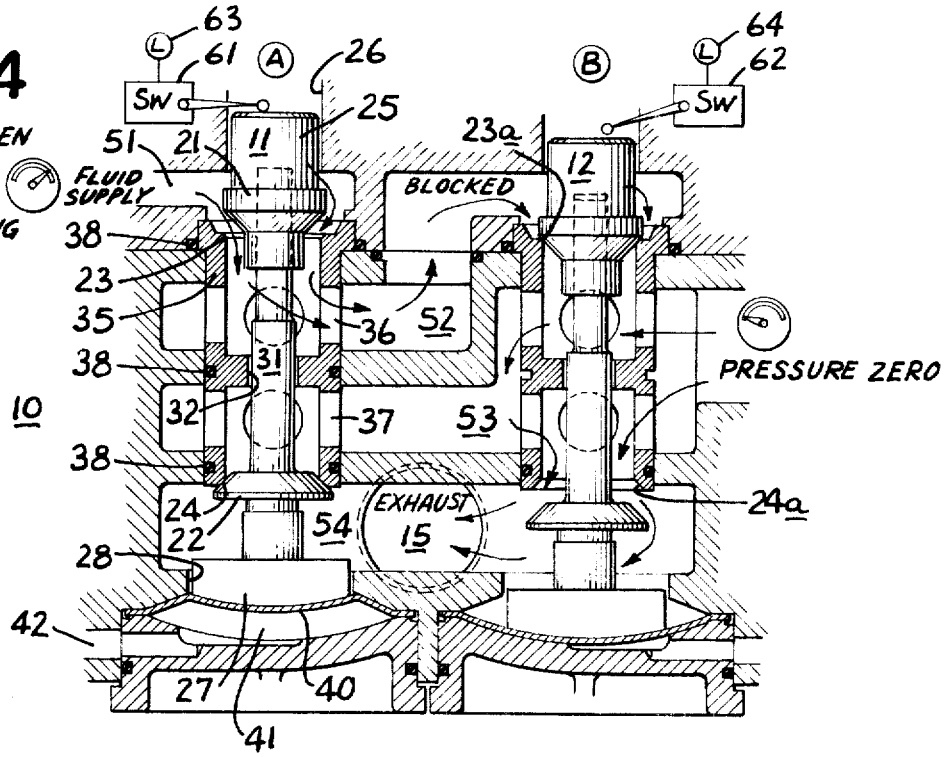
FIG. 4 shows the assembly with the first valve member stuck in open condition.

The additional safety provided by the present valve assembly will be apparent upon inspection of FIGS. 3 and 4 which show the movable valve members respectively stuck in the upper or "on" position.

Thus focusing attention upon FIG. 3 the second portion B of the valve, formed by the valve member 12, is shown stuck in open position. Such sticking may be either due to the physical sticking of the valve member 12 within the housing 10, to the sticking of the pilot valve 43a or solenoid 44a which controls it, or to an electrical malfunction which fails to turn off the solenoid 44a upon command. In short, any malfunction which causes the valve member 12 to remain in its upper or "on" position when it should be turned off is covered by the general term "sticking." In any event, since the inlet valve seats 23, 23a are connected, as shown, in series with one another, the fact that the valve member 11 has responded to the command to drop and is in its lower position insures that the flange 21 is seated against the seat 23 thereby precluding any flow of pressurized fluid from the fluid supply line 13 into the control line 14. Moreover, since the valve member 11 has, on command, dropped to its lower position, flange 22 has separated from seat 24 providing a large and direct connection between the control line chamber 53 and the exhaust line chamber 54 for immediate and complete venting of pressure fluid from the control line 14 into the exhaust line 15. Thus the control line 14 is reliably and completely vented to turn off the clutch of the power press or other controlled machine, and to set the brake, notwithstanding the fact that one half of the valve assembly has failed to respond to command.

Equal protection is provided in the event that the valve member 11 fails to respond as shown in FIG. 4. In this figure the valve member 11 is stuck, either by reason of physical sticking within the housing or by reason of the fact that the pilot valve which controls it has failed to respond. This leaves the seat 23 uncovered so that pressure fluid might enter, but the fact that the valve member 12 has dropped in accordance with command has sealed the valve seat 23a, which is in series with the seat 23, so that pressure fluid is positively blocked against entering the control line 14. Also, while sticking of the valve member 11 in its upper position has failed to uncover the exhaust seat 24, the fact that the valve member 12 has dropped, opens the valve seat 24a to permit immediate and complete venting of pressure fluid from the control line 14 through control line chamber 53 and into exhaust line chamber 54 to the exhaust line 15. Accordingly the pressure in the control line 14 drops to zero to turn off the clutch and set the brake.

The press, in view of the safety factor provided by the above series-parallel assembly, could be operated indefinitely with one side of the valve in stuck condition without the operator being aware. Therefore, detector switches 61, 62 are provided responsive to the axial movements of the valve members and suitably connected to the press control circuitry in such a way as to prevent the next succeeding "on" command if either valve fails to respond to the "off" command. It is, however, unnecessary to show the press control circuitry in order to illustrate the function of the switches and this function may be illustrated by assuming that the switches are connected to individual lamps 63, 64. Where such lamps are employed flashing of each lamp during a single press cycle will serve to assure the operator that both sides of the valve assembly are fully operative, whereas failure of one of the lamps to flash, either by remaining on, or by remaining off, denotes that one side of the valve is stuck so that the press may be shut down until the situation is remedied. In short, while the series-parallel valving arrangement prevents a dangerous malfunction of the press upon failure of a portion of the valve, it is not intended that the press continue to be operated unless both portions of the valve assembly are in working order.

The invention has been discussed in connection with control of a power press wherein failure of the slide to come to rest at the top of the stroke may create hazardous conditions for the operator and the press itself. It will be apparent, however, that the present valve is not limited to use with a power press, and it will be understood that the valve assembly has general utility wherever it is necessary to control a potentially hazardous piece of mechanism by pressure or complete lack of pressure in a control line.

While the construction has been discussed above relating the valve seats to the chambers 51–54, it may be helpful, in understanding the construction, to consider that the first portion A of the valve is a double two-way valve having a total of four ports communicating with the respective chambers 51–54 while the second portion B of the valve is a three-way valve connected at its ends to chambers 52, 54 but with all of the central ports being connected to the control line chamber 53.

I claim as my invention:

1. A safety valve assembly for supplying pressurized fluid from a supply line to a clutch and brake control line to energize the clutch and de-energize the brake and for alternatively exhausting fluid from the control line to an exhaust line to de-energize the clutch and energize the brake which comprises means defining a fluid supply line chamber and an intermediate chamber as well as a control line chamber and an exhaust line chamber, a first valve having a movable valve member cooperating with first and second seats, the first seat being normally closed and the second seat being normally open and having an actuator for activating such valve member, a second valve having a movable valve member cooperating with third and fourth seats, the third seat being normally closed and the fourth seat being normally open and having an actuator for activating such valve member, the first seat being interposed between the supply line chamber and the intermediate chamber and the third seat being interposed between the intermediate chamber and the control line chamber so that such seats are effectively in series with one another with pressurized fluid being passed successively through the first and third seats from the supply line chamber to the control line chamber when the valve members are simultaneously activated by the actuators, the second and fourth seats being both interposed between the control line chamber and the exhaust line chamber with such seats being effectively in parallel with one another so that in the event either one of the movable valve members, upon deactuation, sticks in its activated position (a) flow of pressurized fluid from the supply line will be cut off and (b) [direct access] *a direct path* for exhausted fluid will be provided from the control line to the exhaust line *which bypasses said first and third seats* for insuring that the clutch and brake are in a safe condition.

2. The combination as claimed in claim 1 in which the movable valve members are each in the form of a spool having spaced, inwardly facing flanges cooperating with opposed outwardly facing valve seats with the spools being movable endwise through a limited displacement for alternative closing of the valve seats.

3. The combination as claimed in claim 2 in which the valve seats cooperating with a given spool are formed at the respective ends of a cylindrical insert having lateral openings formed therein.

4. The combination as claimed in claim 1 in which the housing means is unitary enclosing all of said chambers and seats and with means for guiding the movable valve members into seated condition with respect to the seats.

5. A safety valve assembly for supplying pressurized fluid from a supply line to a clutch and brake control line to energize the clutch and de-energize the brake and for alternatively exhausing the fluid from the control line to an exhaust line to de-energize the clutch and energize the brake, which comprises a first valve in the form of a double two-way valve having first and second valve seats defining a total of four ports, the seats being engaged by a valve member movable between limit positions for closing the seats alternatively, a second valve in the form of a three-way valve having third and fourth valve seats defining a total of three ports, the seats being engaged by a valve member movable between limit positions for closing the seats alternatively, separate actuating means for activating the valve members, means for interconnecting the ports associated with the first and third valve seats in series so that when the valve members are both activated, pressurized fluid is conducted in succession past the first and third valve seats, means for interconnecting the ports associated with the second and fourth valve seats in parallel so that when the valve members are both deactuated, exhausted fluid is conducted in parallel past the second and fourth valve seats and so that in the event one of the valve members, upon being deactuated, sticks in its activated position at least the second or fourth seat will remain open to provide direct escape of exhausted fluid from the control line.

6. The combination as claimed in claim 5 in which means are provided for signalling the sticking of one of the valve members.

*7. A safety control system for fluid actuated devices, comprising housing means having a supply port, a control port and at least one exhaust port, first and second valve means in said housing means, each valve means having supply and exhaust valve members movable simultaneously between a supply position in which the supply valve member is open and the exhaust valve member closed, and an exhaust position in which the exhaust valve member is open and the supply valve member is closed, means connecting the supply valve members of said first and second valve means in series between said supply and control ports, and means connecting the exhaust valve members of said first and second valve means in parallel between said control and exhaust ports, whereby the movement of either valve means to its exhaust position when the other valve means remains partially or fully in its supply position will result in a complete cutoff of fluid pressure from the supply to the control port and a direct connection from the control port to at least one of the exhaust ports, said direct connection bypassing the supply valve members of both said first and second valve means.*

*8. The combination according to claim 7, each valve means comprising a spool with inwardly facing flanges comprising the supply and exhaust valve members.*

*9. The combination according to claim 8, said control port being connected to a common chamber disposed between the supply and exhaust valve members of said two valve means.*

*10. The combination according to claim 9, said housing means comprising a single housing.*

*11. The combination according to claim 7, one of said valve means comprising a double two-way valve and the second valve means comprising a three-way valve, pressure responsive means on each valve for shifting it in one direction, and pilot valves connected to said last-mentioned means.*

*12. The combination according to claim 11, said valve means normally being in positions with their supply valve members closed and their exhaust valve members open.*

*13. In a safety control valve system for fluid actuated devices, a housing having a supply port, a control port and an exhaust port, first and second normally closed valve means in said housing, each valve means having facing supply and exhaust valve members, supply and exhaust valve seats alternately engageable by the supply and exhaust valve members of each valve means, a chamber between the supply and exhaust valve seats of each valve means, a direct connection between said chambers whereby they constitute a control line chamber common to both valve means, a direct connection between said control line chamber and said control port, passageway means connecting the supply valve members of both valve means in series between said supply and control ports, whereby one supply valve member is upstream and the other is downstream, means separating*

*said control line chamber from said upstream supply valve member, and a common exhaust chamber for both valve means leading to the exhaust port, said common exhaust chamber being connected to the exhaust valve members of both valve means in parallel and being separated from said passageway means, whereby a direct exhaust passage will be provided between the control port and exhaust port through said control line chamber when either valve means is in its exhaust position, said direct exhaust passage bypassing the supply valve members of both valve means.*

*14. The combination according to claim 13, said supply and control ports being on opposite sides of said housing, said valve means being movable at right angles to the extent of the housing.*

* * * * *

UNITED STATES PATENT OFFICE

CERTIFICATE OF CORRECTION

PATENT NO. : Re. 28,520

DATED : Reissued August 19, 1975

INVENTOR(S) : Kenneth R. Mahorney (deceased)

It is certified that error appears in the above-identified patent and that said Letters Patent are hereby corrected as shown below:

Column 1, line 28, "may be" should be --may not be--.

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*